Nov. 29, 1960     E. H. STANTON     2,962,269
NEEDLE VALVE ASSEMBLY AND ASSOCIATED CARBURETOR ASSEMBLY
Filed April 10, 1958
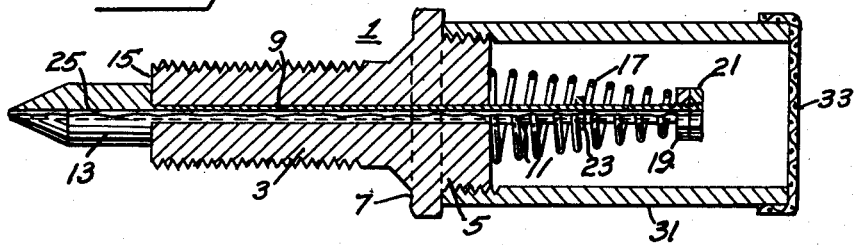
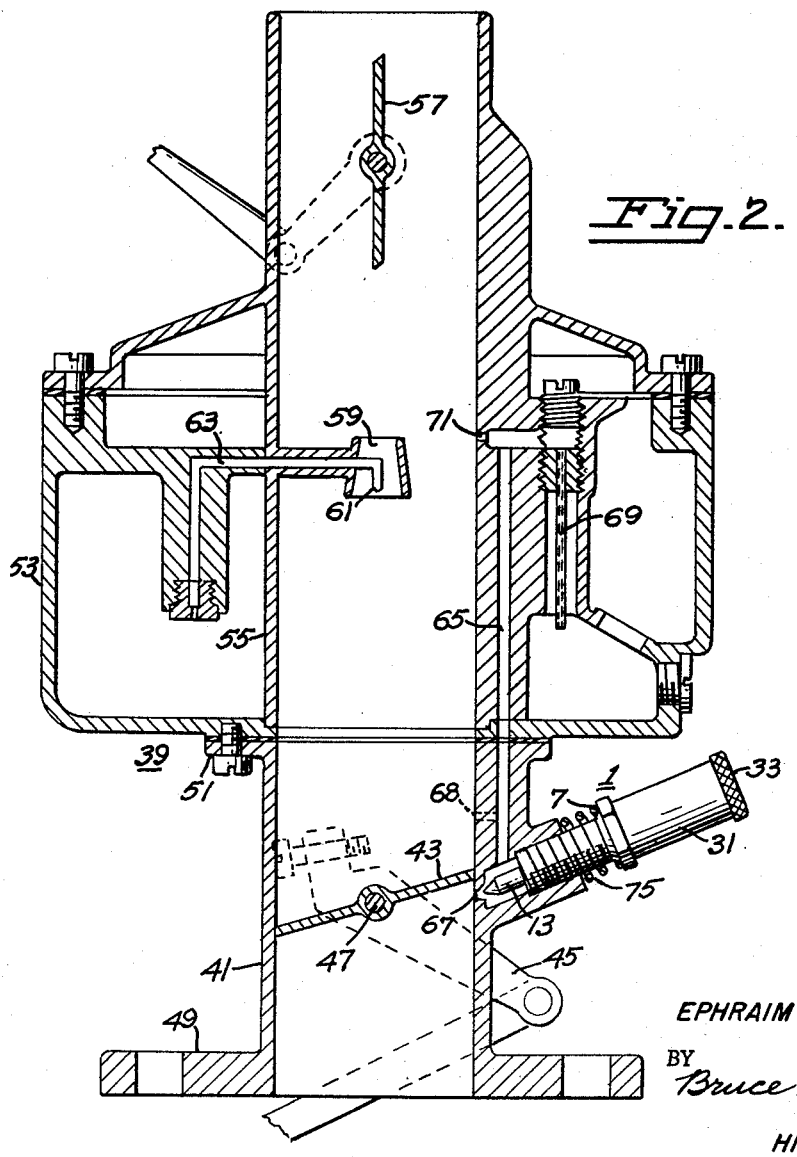
INVENTOR.
EPHRAIM H. STANTON
BY
*Bruce & Brosler*
HIS ATTORNEYS.

2,962,269

NEEDLE VALVE ASSEMBLY AND ASSOCIATED CARBURETOR ASSEMBLY

Ephraim H. Stanton, Oakland, Calif. (1901 Mesa Buena Ave., San Pablo, Calif.)

Filed Apr. 10, 1958, Ser. No. 727,682

7 Claims. (Cl. 261—41)

My invention relates to needle valves and more particularly to a needle valve assembly adaptable to advantage for use in a carburetor assembly or comparable device.

Among the objects of my invention are:

(1) To provide a novel and improved needle valve assembly;

(2) To provide a novel and improved needle valve assembly which is responsive to variations in pressure below a normal pressure;

(3) To provide a novel and improved needle valve assembly adapted for installation in a carburetor assembly with advantageous results;

(4) To provide a novel and improved carburetor assembly;

(5) To provide a novel and improved carburetor assembly which will function more efficiently in the combustion of fuel and thereby reduce the carbon monoxide content of the exhaust gases, especially when idling;

(6) To provide a novel and improved carburetor assembly capable of operating more economically.

Additional objects of my invention will be brought out in the following description of a preferred embodiment of the same taken in conjunction with the accompanying drawings, wherein:

Fig. 1 is a view in section through a needle valve assembly of the present invention;

Fig. 2 is a view in section of the needle valve assembly of Fig. 1, installed in a carburetor assembly.

Referring to the drawings for details of my invention in its preferred form, the needle valve assembly 1 as depicted in Fig. 1, comprises a cylindrical body 3 preferably terminating at one end in an enlargement forming a shoulder 7, the body having a longitudinal bore 9 therethrough to slidably receive the stem 11 of a needle valve 13, the stem being of a length to extend beyond the enlarged end 5 of the valve body, with the valve 13 in abutment against the opposite end 15 of the valve body.

The valve 13 is normally urged to such position against the valve body, by preferably a conical spiral compression spring 17, surrounding the exposed end portion of the valve stem and maintained under compression between the enlarged end of the valve body and a spring stop nut 19 threaded on the end of a valve stem. A second nut 21 applied to the end of the stem serves to lock the first one against accidental shift from its assigned position on the valve stem.

A stop 23 affixed to the exposed stem portion at an intermediate point thereon, will serve to limit the extent of permissible forward movement of the valve against the action of the spring.

The valve and its associated stem are traversed longitudinally by a passageway 25 to permit of flow of air or other gas therethrough.

The cylindrical valve body 3 is preferably threaded to permit of the mounting of the needle valve assembly 1 in the wall of a device in which it is to be installed, thus leaving the extended portion of the valve stem exposed. To therefore protect the passageway 25 through the valve stem and valve, against the entrance of foreign matter which might impede or otherwise interfere with the smooth flow of air or gas through such passage, a cylindrical cap 31 having a filter 33 at one end, is threadedly secured to the enlarged portion 5 of the valve body to thereby effectively enclose the extended portion of the valve stem and protect the passage therethrough from the entrance of foreign matter.

As thus described, the valve 13 is capable of forward movement to the extent permitted by the stop 23 on the valve stem extension, in response to an applied force capable of overcoming the compression of the spring 17, which spring upon withdrawal of such force, will serve to restore the valve to its normal position against the end of the valve body.

The above described needle valve assembly may be employed to advantage in many types of measuring or metering devices, and particularly one such as a carburetor conventionally employed in determining the fuel mixture intake to an internal combustion engine. Such a carburetor, on closing of the throttle valve, provides an idling mixture to maintain operation of the engine under idling conditions.

When an internal combustion engine is running at increased speed with the throttle open and the throttle is then closed rapidly, a time interval elapses before the speed of the engine drops to its idling speed. During this time interval, the intake of fuel is in excess of that necessary to maintain the engine in operation. This not only results in a waste of fuel, but under the conditions noted, combustion of the fuel is not complete, with the result that the exhaust gases contain an excess amount of carbon monoxide gas.

In accordance with the present invention, the needle valve assembly 1 described above, is employed in a carburetor in such a manner as to not only cut down the intake of fuel from the idling fuel supply source during the critical transition period discussed above, but also at the same time assure a more complete combustion of whatever fuel is taken in during this period.

Referring to Fig. 2 of the drawing for the manner in which the needle valve assembly 1 is employed in a carburetor assembly 39 to accomplish the foregoing advantage, the carburetor assembly disclosed, involves a throttle valve 43 whose operation is controlled externally by a lever 45 mounted on an extremity of the pivot shaft 47 which carries the throttle valve.

The throttle barrel has a lower flange 49 for mounting the carburetor on the intake manifold of an internal combustion engine (not shown), and at its upper end, the throttle barrel carries a flange 51 for mounting the float bowl 53 of the carburetor, which bowl has a central wall passageway 55 in line with the throttle barrel. In the upper end of the wall passage may be located the choke valve 57, while at an intermediate location, a Venturi 59 may be located, in which terminates the discharge nozzle 61 for fuel supplied from the bowl 53 by way of a connecting passage 63.

Gasoline entering the wall passageway 55 through the nozzle 61, is mixed with air passing through the Venturi 59 to produce the main fuel mixture supplied to an engine when the throttle valve 43 is in its open condition.

Upon closing of such throttle valve, the engine is maintained in operation at slow or idling speed by a fuel mixture entering the throttle barrel below the throttle valve 43 from a wall passage 65 terminating in a restricted opening 67 in the wall of the throttle barrel. This wall passage 65 has a flow connection 69 to the gas in the bowl 53 and another connection 71 through the wall of the central wall passageway 55 to the source of air entering such passageway.

Normally, the adjustment of the rate of intake of such idling fuel mixture is controlled by a manually adjustable needle valve assembly mounted in the wall of the throttle barrel with its needle valve adjustably mounted with respect to the restricted opening 67 in the wall of the barrel through which the idling fuel mixture enters.

In accordance with the present invention, the air supply derived from the central wall passageway for the idling mixture, is restricted over what it would be for a conventional carburetor assembly, whereby the idling mixture flowing through the wall passage 65 to the intake opening 67 in the throttle barrel will be a richer mixture than in conventional practice. This may be accomplished by eliminating an air metering opening 68 normally provided in many carburetors.

Further, in lieu of the conventional adjustable needle valve previously mentioned, I install my novel and improved needle valve assembly 1, the normal position of the needle valve with respect to the opening 67 being made adjustable by the extent to which the valve body is threaded into the mounting opening. A compression spring 75 disposed between the mounting opening wall and the shoulder 7 will serve to discourage any accidental shifting of the needle valve assembly once such adjustment has been properly made.

With the needle valve assembly thus installed, the deficiency of air supplied to the idling mixture through the opening 71 will be supplemented by air intake through the needle valve assembly 1, and such supplemental air intake will automatically vary with the requirements of the existing conditions, during the transition period under consideration.

For normal idling conditions, the throttle valve 43 being closed, a vacuum will be produced in the throttle barrel below the throttle valve, causing flow of the rich idling mixture through the passage 65 toward the intake opening 67. The quantity of such mixture entering the throttle barrel through the opening will be determined by the initial adjustment of the needle valve assembly as a unit. The deficiency of air in the idling mixture thus flowing to the intake opening 67 will be supplemented by air flowing through the passage 25 through the needle valve assembly. Since the needle valve terminates adjacent the intake opening 67, such supplemental air will serve to disperse and atomize the rich idling mixture entering the barrel, thereby to produce a more homogeneous mixture of air and gas, in which condition, it can be more effectively and more efficiently combusted in the cylinders of the engine.

The needle valve spring 17 may be of such calibration as to just resist any forward movement of the needle valve 13 under the conditions of vacuum existing during normal idling, or the spring may be of sufficiently weaker calibration as to permit of limited forward movement of the needle valve under such vacuum conditions as exist during normal idling, but whatever the case may be, the adjustment of the needle valve assembly as a unit during idling conditions will automatically take this into consideration.

Once the needle valve assembly has been properly installed to take care of normal idling conditions, it will automatically function thereafter to effectively take care of conditions developing during the transition period when the throttle valve is closed and the motor speed is dropping down to normal idling speed.

During normal operation of the engine under load conditions, the throttle valve 43 is open and a degree of vacuum will exist in the throttle barrel which will be higher than obtains during normal idling conditions. This results in the needle valve 13 being pulled in toward the restricted opening 67 to reduce the effective opening at this point.

The higher degree of vacuum in the throttle barrel, will at the same time increase intake of air through the needle valve assembly to more effectively atomize the mixture in the throttle barrel and greatly increase exposed surface areas of gas particles. The increase in exposed areas of gas particles in combination with the increase in air intake means more efficient utilization of the fuel. This in turn means more power per unit of gas, less carbon monoxide in the exhaust gases, and greater economy of operation.

Upon closing of the throttle valve, the then existing higher-than-normal idling speed of the engine continues to produce a higher degree of vacuum in the throttle barrel below the throttle valve than exists during normal idling conditions and, as a result, the needle valve 13 will tend to remain in a forward restricting position, whereby not only will the quantity of the rich idling mixture be cut down, but the higher degree of vacuum will continue to cause a greater inflow of air through the needle valve assembly, so that what little of the rich idling mixture is permitted to enter the throttle barrel, will not only be thoroughly dispersed and atomized, but will be made into a much leaner mixture than that entering during normal idling.

As the speed of the engine gradually drops toward normal idling speed, the degree of vacuum is reduced and as a result the needle valve will be gradually retracted in accordance with the decrease in speed until normal idling speed is reached, at which point the needle valve will have been restored to its normal idling position and the idling mixture will have been restored to that required for normal idling. In this connection, the air flow through the needle valve will serve to overcome any viscosity or surface tension effects of the rich idling mixture that might cause the valve to stick or slow up its return, thus aiding the spring 17.

From the foregoing description of my invention in its preferred form, it will be apparent that the same fulfills all the objects of my invention, and while I have disclosed the same in detail and in its preferred form, the invention is subject to modification and alteration without departing from the underlying principles involved. For example, a plurality of needle valve assemblies may be assembled about the throttle barrel when substantial quantities of atomized material is desired. I accordingly do not desire to be limited in my protection to the specific details illustrated and described except as may be necessitated by the appended claims.

I claim:

1. A carburetor assembly comprising a throttle barrel, a throttle valve pivotally secured in said barrel, a carburetor bowl mounted adjacent said throttle barrel and having a central wall passageway in line with said throttle barrel, a Venturi in said passageway at an intermediate location therein, a nozzle in said Venturi and having a passageway connection to the interior of said bowl, means providing a passageway from said bowl and opening into said throttle barrel at a point below said throttle valve, and an air connection to said passageway to furnish an idling mixture upon closure of said throttle valve, said air connection being sufficiently restricted to produce a rich idling mixture in said passageway, and means, during normal idling conditions, for supplying to said rich idling mixture at its point of entrance into said throttle barrel below said throttle valve, sufficient air flow to provide a normal idling mixture, said means being responsive to a higher than idling vacuum condition in said throttle barrel, for restricting flow of said rich idling mixture while increasing said air flow to create a leaner than normal idling mixture, whereby to conserve fuel and achieve more complete combustion during such portions of throttling periods when normal idling mixture is not required.

2. A carburetor assembly comprising a throttle barrel having a lower flange for attachment to an engine manifold, and an upper flange, a throttle valve pivotally secured in said barrel, a carburetor bowl mounted on said upper flange and having a central wall passageway in line with said throttle barrel, a Venturi in said passageway at an intermediate location therein, a nozzle in said Venturi and having a passageway connection to the interior of said bowl, means providing a passageway from said bowl and opening into said throttle barrel at a point below said throttle valve, and an air connection to said passageway from said central walled passageway at a point above said Venturi to furnish an idling mixture upon closure of said throttle valve, said air connection being sufficiently restricted to produce a rich idling mixture in said passageway, and means, during normal idling conditions, for supplying to said rich idling mixture at its point of entrance into said throttle barrel below said throttle valve, sufficient air flow to provide a normal idling mixture, said means being responsive to a higher than idling vacuum condition in said throttle barrel, for restricting flow of said rich idling mixture while increasing said air flow, to create a leaner than normal idling mixture, while said higher than idling vacuum condition prevails.

3. A needle valve assembly comprising an externally threaded valve assembly body having a longitudinal bore therethrough, a needle valve adapted to abut an end of said body and having a valve stem slidably fitting said body bore and extending beyond the opposite end of said body, said needle valve and valve stem having a passageway therethrough, and terminating in exposure to the universal atmosphere, a compression spring about the extended portion of said valve stem and urging said needle valve toward the proximate end of said body, and a stop on the exposed portion of said valve stem in spaced relationship to said body to limit forward movement of said needle valve against the action of said spring.

4. A needle valve assembly comprising an externally threaded valve assembly body having a longitudinal bore therethrough, said body terminating at one end in an enlarged externally threaded end, a needle valve adapted to abut the other end of said body and having a valve stem slidably fitting said body bore and extending beyond the enlarged end of said body, said needle valve and stem having a passageway therethrough, and terminating in exposure to the universal atmosphere, a compression spring about the extended portion of said valve stem and urging said needle valve toward the proximate end of said body, a stop on the exposed portion of said valve stem in spaced relationship to the enlarged end of said body to limit forward movement of said needle valve against the action of said spring, and a cap threadedly secured to the enlarged end of said body and enclosing the extended portion of said stem and said spring.

5. A needle valve assembly comprising an externally threaded valve assembly body having a longitudinal bore therethrough, said body terminating at one end in an enlarged externally threaded end, a needle valve adapted to abut the other end of said body and having a valve stem slidably fitting said body bore and extending beyond the enlarged end of said body, said needle valve and stem having a passageway therethrough, a compression spring about the extended portion of said valve stem and urging said needle valve toward the proximate end of said body, a stop on the exposed portion of said valve stem in spaced relationship to the enlarged end of said body to limit forward movement of said needle valve against the action of said spring, and a cap threadedly secured to the enlarged end of said body and enclosing the extended portion of said stem and said spring, said cap having an air filter in the end thereof.

6. A needle valve assembly comprising a valve assembly body having a longitudinal bore therethrough, a needle valve adapted to abut an end of said body and having a valve stem slidably fitting said body bore and extending beyond the opposite end of said body, said needle valve and stem having a passageway therethrough exposable at all times to the universal atmosphere, a compression spring about the extended portion of said valve stem and urging said needle valve toward the proximate end of said body, and means in said meter valve assembly for limiting forward movement of said needle valve.

7. A needle valve assembly comprising a valve assembly body having a longitudinal bore therein, a needle valve having a valve stem slidably receivable in said longitudinal bore, spring means operatively disposed between said valve assembly body and said needle valve to normally urge said needle valve to a retracted position, said needle valve and stem having a passageway therein exposable at all times at its stem end to the universal atmosphere, whereby said needle valve in any installation of the needle valve assembly may be exposed to an inexhaustible and constant supply of air.

References Cited in the file of this patent
UNITED STATES PATENTS

| 2,590,217 | Snyder et al. | Mar. 25, 1952 |
| 2,749,894 | Soriti et al. | June 12, 1956 |
| 2,840,359 | Cornelius | June 24, 1958 |

FOREIGN PATENTS

| 807,146 | Germany | June 25, 1951 |